US012718568B2

(12) United States Patent
Zhu et al.

(10) Patent No.: US 12,718,568 B2
(45) **Date of Patent: *Aug. 25, 2026**

(54) OBSTACLE RECOGNITION METHOD AND APPARATUS, AND DEVICE, MEDIUM AND WEEDING ROBOT

(71) Applicant: Suzhou Cleva Precision Machinery & Technology Co., Ltd., Suzhou (CN)

(72) Inventors: Shaoming Zhu, Suzhou (CN); Xue Ren, Suzhou (CN)

(73) Assignee: Suzhou Cleva Precision Machinery & Technology Co., Ltd., Suzhou (CN)

( * ) Notice: Subject to any disclaimer, the term of this patent is extended or adjusted under 35 U.S.C. 154(b) by 629 days.

This patent is subject to a terminal disclaimer.

(21) Appl. No.: 18/251,942

(22) PCT Filed: Nov. 30, 2020

(86) PCT No.: PCT/CN2020/132569

§ 371 (c)(1),
(2) Date: May 5, 2023

(87) PCT Pub. No.: WO2022/095170

PCT Pub. Date: May 12, 2022

(65) Prior Publication Data

US 2024/0087321 A1 Mar. 14, 2024

(30) Foreign Application Priority Data

Nov. 9, 2020 (CN) ......................... 202011240905.8

(51) Int. Cl.
*G06V 10/44* (2022.01)
*A01M 21/00* (2006.01)
(Continued)

(52) U.S. Cl.
CPC ............. *G06V 20/50* (2022.01); *A01M 21/00* (2013.01); *G06T 7/12* (2017.01); *G06T 7/155* (2017.01);
(Continued)

(58) Field of Classification Search
CPC ...... G06V 20/50; G06V 10/267; G06V 10/44; G06V 10/56; G06V 20/56; G06V 10/26;
(Continued)

(56) References Cited

U.S. PATENT DOCUMENTS

2016/0086052 A1* 3/2016 Piekniewski ........... G06T 7/292 382/103
2018/0084708 A1* 3/2018 Neitemeier .......... A01B 69/001
2018/0356832 A1 12/2018 Reinert et al.

FOREIGN PATENT DOCUMENTS

CN 106155053 A 11/2016
CN 108428239 A 8/2018
(Continued)

OTHER PUBLICATIONS

Minh, Vu Hoang, et al. "Smoothness-based Edge Detection using Low-SNR Camera for Robot Navigation." arXiv preprint arXiv: 1710.01416 (2017). (Year: 2017).*
(Continued)

*Primary Examiner* — Amandeep Saini
*Assistant Examiner* — Denise G Alfonso
(74) *Attorney, Agent, or Firm* — JK Intellectual Property Law, PA

(57) ABSTRACT

An obstacle recognition method includes determining a candidate obstacle region in a candidate weeding region image according to color information of the candidate weeding region image; obtaining contour information of the candidate obstacle region, wherein the contour information includes chrominance information, range information, and
(Continued)

roughness information; and determining, according to preset contour information determination conditions and the contour information, whether there is an obstacle in the candidate weeding region image. A related obstacle recognition apparatus, an electronic device, a computer-readable storage medium, and a weeding robot are also disclosed.

7 Claims, 2 Drawing Sheets

(51) Int. Cl.

| | |
|---|---|
| ***G06T 7/12*** | (2017.01) |
| ***G06T 7/155*** | (2017.01) |
| ***G06T 7/73*** | (2017.01) |
| ***G06T 7/90*** | (2017.01) |
| ***G06V 10/26*** | (2022.01) |
| ***G06V 10/56*** | (2022.01) |
| ***G06V 20/50*** | (2022.01) |

(52) U.S. Cl.
CPC .................. *G06T 7/73* (2017.01); *G06T 7/90* (2017.01); *G06V 10/267* (2022.01); *G06V 10/44* (2022.01); *G06V 10/56* (2022.01); *G06T 2207/10024* (2013.01); *G06T 2207/20036* (2013.01)

(58) Field of Classification Search
CPC .......... A01M 21/00; G06T 7/12; G06T 7/155; G06T 7/73; G06T 7/90; G06T 2207/10024; G06T 2207/20036; A01B 39/18; A01B 69/001; A01D 34/008
See application file for complete search history.

(56) References Cited

FOREIGN PATENT DOCUMENTS

| | | | |
|---|---|---|---|
| CN | 110347153 | A | 10/2019 |
| CN | 111399502 | A | 7/2020 |
| CN | 111413977 | A | 7/2020 |

OTHER PUBLICATIONS

International Search Report for Application No. PCT/CN2020/132569, dated Jun. 24, 2021.

* cited by examiner

OBSTACLE RECOGNITION METHOD AND APPARATUS, AND DEVICE, MEDIUM AND WEEDING ROBOT

CROSS-REFERENCE TO RELATED PATENT APPLICATIONS

This application is a national stage of International Application No. PCT/CN2020/132569, filed on Nov. 30, 2020, which claims priority to CN patent application No. 202011240905.8, filed on Nov. 9, 2020. All of the aforementioned applications are hereby incorporated by reference in their entireties.

TECHNICAL FIELD

The present application relates to image processing technology, in particular to an obstacle recognition method and apparatus, a device, a medium, and a weeding robot.

BACKGROUND

With the improvement of living standards, people are increasingly paying attention to environmental construction, so the construction of urban green gardens is receiving increasing attention. Meanwhile, efficient green maintenance, such as daily weeding, has gradually become a demand. However, manual control is required for conventional weeding machines, so weeding robots with autonomous working functions are gradually emerging.

In existing technologies, boundary wires are generally buried to calibrate boundaries of a weeding region for a weeding robot, and consequently a lot of manpower and material resources are consumed and costs are increased. In addition, due to limitations on the burying of boundary wires, for example, corners should not be less than 90 degrees, a shape of the weeding region is limited to some extent.

SUMMARY

Embodiments of the present disclosure provide an obstacle recognition method and apparatus, a device, a medium, and a weeding robot to improve recognition efficiency and accuracy of obstacles in a candidate weeding region for a weeding robot.

In a first aspect, an embodiment of the present disclosure provides an obstacle recognition method. The method includes:

- determining a candidate obstacle region in a candidate weeding region image according to color information of the candidate weeding region image;
- obtaining contour information of the candidate obstacle region, where the contour information includes chrominance information, range information, and roughness information; and
- determining, according to preset contour information determination conditions and the contour information, whether there is an obstacle in the candidate weeding region image.

In a second aspect, an embodiment of the present disclosure further provides an obstacle recognition apparatus. The apparatus includes:

- a candidate obstacle region determination module, configured to determine a candidate obstacle region in a candidate weeding region image according to color information of the candidate weeding region image;

- a contour information obtaining module, configured to obtain contour information of the candidate obstacle region, where the contour information includes chrominance information, range information, and roughness information; and
- an obstacle determination module, configured to determine, according to preset contour information determination conditions and the contour information, whether there is an obstacle in the candidate weeding region image.

In a third aspect, an embodiment of the present disclosure further provides an electronic device. The electronic device includes:

- one or more processors; and
- a storage apparatus, configured to store one or more programs.

When the one or more programs are executed by the one or more processors, the one or more processors are enabled to implement the foregoing obstacle recognition method.

In a fourth aspect, an embodiment of the present disclosure further provides a computer-readable storage medium storing a computer program. When the program is executed by a processor, the foregoing obstacle recognition method is implemented.

In a fifth aspect, an embodiment of the present disclosure further provides a weeding robot, including a robot body and the foregoing electronic device.

According to the embodiments of the present disclosure, a candidate obstacle region in a candidate weeding region image is determined according to color information of the candidate weeding region image; contour information of the candidate obstacle region is obtained, where the contour information includes chrominance information, range information, and roughness information; and whether there is an obstacle in the candidate weeding region image is determined according to preset contour information determination conditions and the contour information. Thus, problems in existing technologies that boundary wires are generally buried to calibrate boundaries of a weeding region for a weeding robot and consequently a lot of manpower and material resources are consumed and costs are increased are solved. In addition, a problem that a shape of the weeding region is limited to some extent due to limitations on the burying of boundary wires is solved. The present disclosure improves recognition efficiency and accuracy of obstacles in the candidate weeding region for the weeding robot.

DETAILED DESCRIPTION OF THE EMBODIMENTS

The present disclosure will be further described in detail below with reference to the accompanying drawings and embodiments. It should be appreciated that the specific embodiments described here are merely used for explaining the present disclosure, rather than limiting the present disclosure. In addition, it should be noted that, for the ease of description, only the parts related to the present disclosure, not all structures, are shown in the accompanying drawings.

Embodiment 1

Figure 1:
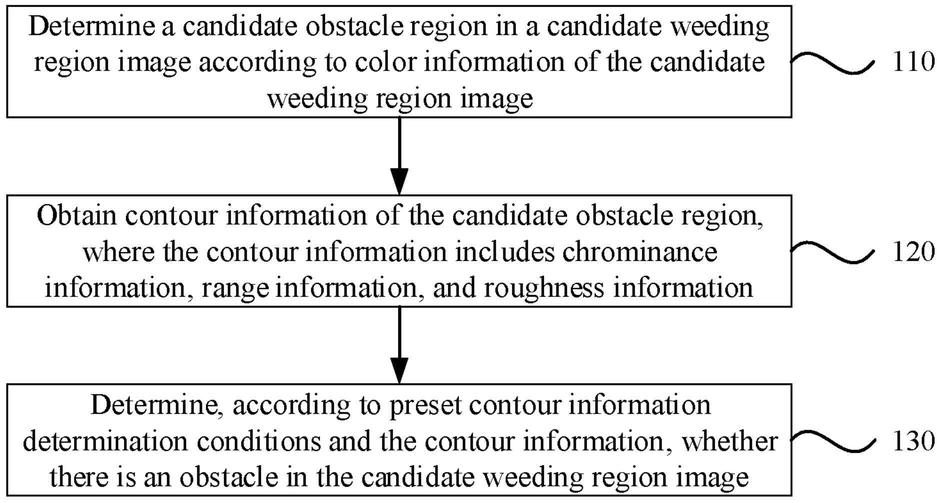
FIG. 1 is a flowchart of an obstacle recognition method provided in Embodiment 1 of the present disclosure.

FIG. 1 is a flowchart of an obstacle recognition method provided in Embodiment 1 of the present disclosure. This embodiment may be applied to a situation where a weeding robot recognizes obstacles in a candidate weeding region. The method may be performed by an obstacle recognition apparatus provided in an embodiment of the present disclosure, and the apparatus may be implemented by software and/or hardware. With reference to FIG. 1, the obstacle recognition method provided in this embodiment includes:

Step 110: Determine a candidate obstacle region in a candidate weeding region image according to color information of the candidate weeding region image.

A candidate weeding region is a region in which a weeding robot may work and in which all weeds may be about to be removed, namely, a weeding region. The candidate weeding region may be a region that has an artificial boundary, or that is originally of special colors such as white or cement but is easily mistakenly recognized as a weeding region due to long grass coverage, namely, an obstacle or boundary region.

The candidate weeding region image may be captured by a camera installed on the weeding robot, which is not limited in this embodiment. The color information of the candidate weeding region image may include information such as Hue, Saturation, and Value of the image, which is not limited in this embodiment. A probable obstacle region is determined from the candidate weeding region image through the color information. For example, the region significantly different from the surrounding in color in the image is determined as a candidate obstacle region according to the color information.

In this embodiment, optionally, the determining a candidate obstacle region in a candidate weeding region image according to color information of the candidate weeding region image includes:

- obtaining a color segmentation image of the candidate weeding region image according to the color information of the candidate weeding region image; and
- morphologically processing the color segmentation image, and determining a region with a preset color as the candidate obstacle region from the morphologically processed color segmentation image.

With regard to obtaining a color segmentation image of the candidate weeding region image according to the color information of the candidate weeding region image, color segmentation may be performed through dynamic color segmentation, edge texture method segmentation, fixed threshold segmentation, Otsu threshold segmentation, or the like to obtain the color segmentation image of the candidate weeding region image. The color segmentation image may be a binary image. The color segmentation image is further morphologically processed, where the morphological processing may be an inverse operation, an open operation, a close operation, or the like, which is not limited in this embodiment.

The region with a preset color is determined as the candidate obstacle region from the morphologically processed color segmentation image. For example, a black region is used as a weeding region, and a white region is used as a candidate obstacle region for further recognition. The color segmentation image is obtained for preliminary classification of the candidate weeding region, and is morphologically processed to improve accuracy of determining the candidate obstacle region.

Step 120: Obtain contour information of the candidate obstacle region, where the contour information includes chrominance information, range information, and roughness information.

The contour information is contour information of a single candidate obstacle region, and may be obtained through contour detection on the candidate obstacle region. The contour information includes chrominance information, range information, and roughness information, where the chrominance information is used to represent a color characteristic of the candidate obstacle region, which may be an average chrominance of a contour of the candidate obstacle region. The average chrominance may be calculated by dividing a sum of chrominance values of all pixels in an obstacle region within the contour of the single candidate obstacle region by a total number of pixels in the obstacle region within the contour.

The range information is used to represent a size of the candidate obstacle region, which may be area, diagonal length, width, height, number of pixels, or the like. This is not limited in the embodiment.

The roughness information is used to display roughness of edges of the candidate obstacle region, which may be average roughness. The average roughness may be calculated by dividing a sum of roughness of all pixels in the obstacle region within the contour by a total number of pixels in the obstacle region within the contour, which is not limited in this embodiment.

Step 130: Determine, according to preset contour information determination conditions and the contour information, whether there is an obstacle in the candidate weeding region image.

The contour information of the candidate obstacle region is compared with the preset contour information determination conditions, where the preset contour information determination conditions are related to the chrominance information, the range information, and the roughness information. If the preset contour information conditions are satisfied, the candidate obstacle region is determined as an obstacle region, that is, there is an obstacle in the candidate weeding region image where the obstacle region is located, so that the weeding robot performs subsequent obstacle processing.

For example, the recognized obstacle is an artificial boundary, or a region that is originally of special colors such as white or cement but is easily mistakenly recognized as a weeding region due to long grass coverage.

According to the technical solution provided in this embodiment, a candidate obstacle region in a candidate weeding region image is determined according to color information of the candidate weeding region image; contour information of the candidate obstacle region is obtained, where the contour information includes chrominance information, range information, and roughness information; and whether there is an obstacle in the candidate weeding region image is determined according to preset contour information determination conditions and the contour information. Thus, problems in existing technologies that boundary wires are generally buried to calibrate boundaries of a weeding region where a weeding robot works and consequently a lot of manpower and material resources are consumed and costs are increased are solved. In addition, a problem that a shape of the weeding region is limited to some extent due to limitations on the burying of boundary wires is solved. The present disclosure improves recognition efficiency and accuracy of obstacles in the candidate weeding region for the weeding robot.

Embodiment 2

Figure 2:
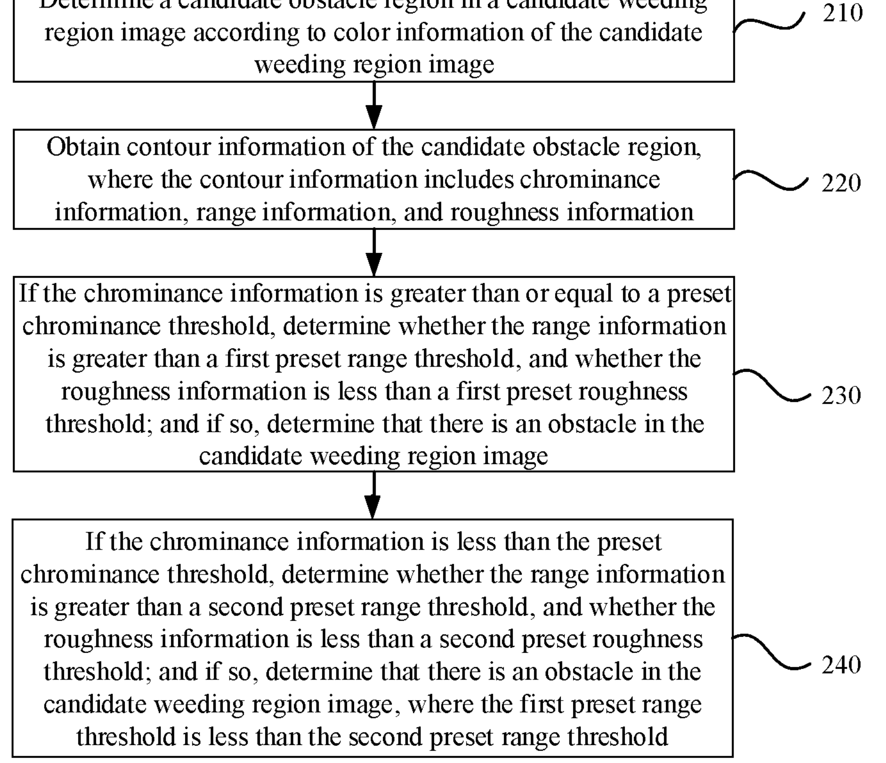
FIG. 2 is a flowchart of an obstacle recognition method provided in Embodiment 2 of the present disclosure.

FIG. 2 is a flowchart of an obstacle recognition method provided in Embodiment 2 of the present disclosure. This technical solution supplements the process of determining, according to preset contour information determination conditions and the contour information, whether there is an obstacle in the candidate weeding region image. Compared with the foregoing solution, the specific optimization of this solution is as follows: the determining, according to preset contour information determination conditions and the contour information, whether there is an obstacle in the candidate weeding region image includes:

- if the chrominance information is greater than or equal to a preset chrominance threshold, determining whether the range information is greater than a first preset range threshold, and whether the roughness information is less than a first preset roughness threshold; and
- if so, determining that there is an obstacle in the candidate weeding region image; or
- if the chrominance information is less than the preset chrominance threshold, determining whether the range information is greater than a second preset range threshold, and whether the roughness information is less than a second preset roughness threshold; and
- if so, determining that there is an obstacle in the candidate weeding region image, where the first preset range threshold is less than the second preset range threshold. Specifically, a flowchart of obstacle recognition is shown in FIG. 2:

Step 210: Determine a candidate obstacle region in a candidate weeding region image according to color information of the candidate weeding region image.

Step 220: Obtain contour information of the candidate obstacle region, where the contour information includes chrominance information, range information, and roughness information.

Step 230: If the chrominance information is greater than or equal to a preset chrominance threshold, determine whether the range information is greater than a first preset range threshold, and whether the roughness information is less than a first preset roughness threshold; and if so, determine that there is an obstacle in the candidate weeding region image.

The preset chrominance threshold is used to determine whether the candidate obstacle region is close to the color of grass, which may be determined based on experience. If the chrominance information is greater than or equal to the preset chrominance threshold, it indicates that the candidate obstacle region exceeds a color determination range of grass, and a size of the candidate obstacle region is further determined with the range information and the roughness information. If the chrominance information is greater than or equal to the preset chrominance threshold, the range information is greater than the first preset range threshold, and the roughness information is less than the first preset roughness threshold, it indicates that the candidate obstacle region is an obstacle region, that is, there is an obstacle in the candidate weeding region image. For example, the obstacle region is a dark boundary artificially built in the weeding region or an iron fence partially covered by grass.

For example, the chrominance information is an average chrominance $SContours_i$ of the contour of the candidate obstacle region, where i is a number of the candidate obstacle region; the range information is a diagonal length $AContours_i \cdot diagonal$ of the candidate obstacle region or a height $AContours_i \cdot height$ of the candidate obstacle region; and the roughness information is an average roughness $HContours_i$ of the contour of the candidate obstacle region, and a smaller average roughness indicates a larger probability that the candidate obstacle region is an obstacle region. If the preset chrominance threshold is 85, a diagonal threshold of the first preset range threshold is 65, a height threshold is 40, and the first preset roughness threshold is 0.25, the preset contour information determination conditions are $SContours_i \geq 85$, $AContours_i \cdot diagonal > 65$, and $HContours_i < 0.25$, or $SContours_i \geq 85$, $AContours_i \cdot height > 40$, and $HContours_i < 0.25$.

Step 240: If the chrominance information is less than the preset chrominance threshold, determine whether the range information is greater than a second preset range threshold, and whether the roughness information is less than a second preset roughness threshold; and if so, determine that there is an obstacle in the candidate weeding region image, where the first preset range threshold is less than the second preset range threshold.

If the chrominance information is less than the preset chrominance threshold, it indicates an increased probability that the candidate obstacle region is not an obstacle region, and the size of the candidate obstacle region is further determined with the range information. If the chrominance information is less than the preset chrominance threshold, the range information is greater than the second preset range threshold, and the roughness information is less than the second preset roughness threshold, it indicates that the candidate obstacle region is an obstacle region, that is, there is an obstacle in the candidate weeding region image.

For example, if the preset chrominance threshold is 85, a diagonal threshold of the second preset range threshold is 105, the height threshold is 70, and the second preset roughness threshold is 0.24, the preset contour information determination conditions are $SContous_i < 85$, $AContours_i \cdot diagonal > 105$, and $HContours_i < 0.24$, or $SContours_i < 85$, $AContours_i \cdot height > 70$, and $HContours_i < 0.24$.

The first preset range threshold is less than the second preset range threshold, that is, when the chrominance information of the candidate obstacle region is greater than or equal to the preset chrominance threshold, the probability that the candidate obstacle region is an obstacle region increases, and the range determination condition for the candidate obstacle region is reduced, that is, the determination condition is greater than a smaller value to expand the range to determine obstacles, thereby improving the accuracy of obstacle recognition.

In this embodiment, optionally, the contour information further includes: position information; and

- correspondingly, the determining, according to preset contour information determination conditions and the contour information, whether there is an obstacle in the candidate weeding region image includes:
- if the chrominance information is greater than or equal to the preset chrominance threshold, the range information is greater than the first preset range threshold, and the roughness information is less than the first preset roughness threshold, or
- if the chrominance information is less than the preset chrominance threshold, the range information is greater than the second preset range threshold, and the roughness information is less than the second preset roughness threshold, determining whether the position information is greater than a preset position threshold; and if so, determining that there is an obstacle in the candidate weeding region image.

The position information is used to display the distance between the candidate obstacle region and the weeding robot, for example, a y-axis coordinate value at a bottom right corner of a minimum bounding rectangle of a single candidate obstacle region, which is not limited in this embodiment.

Whether the position information is greater than the preset position threshold is further determined on the basis of the foregoing determination.

For example, the position information is a y-axis coordinate value $SContours_i$ at a bottom right corner of a minimum bounding rectangle of a single candidate obstacle region. A larger coordinate value indicates that the candidate obstacle region is closer to the robot. For example, if the preset position threshold is 75, the preset contour information determination conditions may be $SContours_i \geq 85$, $AContours_i \cdot diagonal > 65$, $HContours_i < 0.25$, and $YContours_i > 75$, or $SContours_i < 85$, $AContours_i \cdot diagonal > 105$, $HContours_i < 0.24$, and $YContours_i > 75$.

The candidate obstacle region is further determined as an obstacle region through the position information, and the closer candidate obstacle region is processed to reduce processed data and improve the efficiency of obstacle recognition.

In this embodiment, optionally, determining the roughness information includes:

obtaining a value channel image of the candidate weeding region image;

performing edge extraction on the value channel image to obtain an edge image; and determining the roughness information according to gray values of pixels in edge information of the edge image.

Channel separation is performed on the candidate weeding region image to obtain the value channel image of the candidate weeding region image. Optionally, the value channel image is pre-processed, including filtration, normalization, and the like, which is not limited in this embodiment. Edge extraction is performed on the pre-processed value channel image to obtain the edge image. A canny operator may be used for the edge extraction to improve accuracy of obtaining the edge information in the edge image.

The roughness information of the candidate obstacle region is determined through the edge information in the edge image of the corresponding position of the candidate obstacle region, where the edge information includes gray values of pixels in the contour of the candidate obstacle region. When the roughness information is an average roughness, the average roughness of the edge of the candidate obstacle region may be obtained by dividing the number of pixels with a gray value equal to 255 in the contour by the total number of pixels in the contour.

The roughness information is determined through the gray values of the pixels in the edge information of the edge image, which improves the accuracy of obtaining the roughness information, thereby improving the accuracy of obstacle recognition.

According to the embodiment of the present disclosure, whether there is an obstacle in the candidate weeding region image is determined according to the chrominance information, range information, and roughness information of the candidate obstacle region, which improves the accuracy of recognizing an obstacle region that is easily overlooked due to its special color and small area.

Embodiment 3

Figure 3:
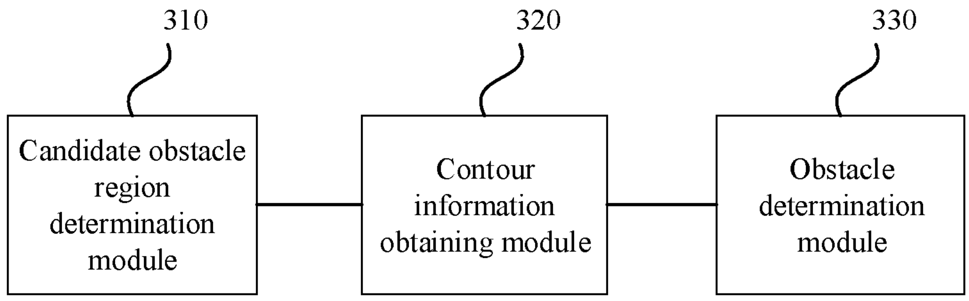
FIG. 3 is a schematic structural diagram of an obstacle recognition apparatus provided in Embodiment 3 of the present disclosure.

FIG. 3 is a schematic structural diagram of an obstacle recognition apparatus provided in Embodiment 3 of the present disclosure. The apparatus may be implemented by hardware and/or software, may perform the obstacle recognition method provided in any embodiment of the present disclosure, and has corresponding functional modules and beneficial effects for performing the method. As shown in FIG. 3, the apparatus includes:

a candidate obstacle region determination module 310, configured to determine a candidate obstacle region in a candidate weeding region image according to color information of the candidate weeding region image;

a contour information obtaining module 320, configured to obtain contour information of the candidate obstacle region, where the contour information includes chrominance information, range information, and roughness information; and an obstacle determination module 330, configured to determine, according to preset contour information determination conditions and the contour information, whether there is an obstacle in the candidate weeding region image.

According to the technical solution provided in this embodiment, a candidate obstacle region in a candidate weeding region image is determined according to color information of the candidate weeding region image; contour information of the candidate obstacle region is obtained, where the contour information includes chrominance information, range information, and roughness information; and whether there is an obstacle in the candidate weeding region image is determined according to preset contour information determination conditions and the contour information. Thus, problems in existing technologies that boundary wires are generally buried to calibrate boundaries of a weeding region for a weeding robot and consequently a lot of manpower and material resources are consumed and costs are increased are solved. In addition, a problem that a shape of the weeding region is limited to some extent due to limitations on the burying of boundary wires is solved. The present disclosure improves recognition efficiency and accuracy of obstacles in the candidate weeding region for the weeding robot.

On the basis of the foregoing technical solutions, optionally, the candidate obstacle region determination module includes:

a color segmentation image obtaining unit, configured to obtain a color segmentation image of the candidate weeding region image according to the color information of the candidate weeding region image; and a candidate obstacle region determination unit, configured to morphologically process the color segmentation image, and determine a region with a preset color as the candidate obstacle region from the morphologically processed color segmentation image.

On the basis of the foregoing technical solutions, optionally, the obstacle determination module includes:

a first obstacle determination unit, configured to, if the chrominance information is greater than or equal to a preset chrominance threshold, determine whether the range information is greater than a first preset range threshold, and whether the roughness information is less than a first preset roughness threshold; and if so, determine that there is an obstacle in the candidate weeding region image; and a second obstacle determination unit, configured to, if the chrominance information is less than the preset chrominance threshold, determine whether the range information is greater than a second preset range threshold, and whether the roughness information is less than a second preset roughness threshold; and if so, determine that there is an obstacle in the candidate weeding region image, where the first preset range threshold is less than the second preset range threshold.

On the basis of the foregoing technical solutions, optionally, the contour information further includes: position information; and correspondingly, the obstacle determination module includes:

a third obstacle determination unit, configured to, if the chrominance information is greater than or equal to the preset chrominance threshold, the range information is greater than the first preset range threshold, and the roughness information is less than the first preset roughness threshold, or if the chrominance information is less than the preset chrominance threshold, the range information is greater than the second preset range threshold, and the roughness information is less than the second preset roughness threshold, determine whether the position information is greater than a preset position threshold, and whether the roughness information is less than the preset roughness thresholds; and if so, determine that there is an obstacle in the candidate weeding region image.

On the basis of the foregoing technical solutions, optionally, the roughness information determination module includes:

a value channel image obtaining unit, configured to obtain a value channel image of the candidate weeding region image;

an image edge extraction unit, configured to perform edge extraction on the value channel image to obtain an edge image; and a roughness information determination unit, configured to determine the roughness information according to gray values of pixels in edge information of the edge image.

Embodiment 4

Figure 4:
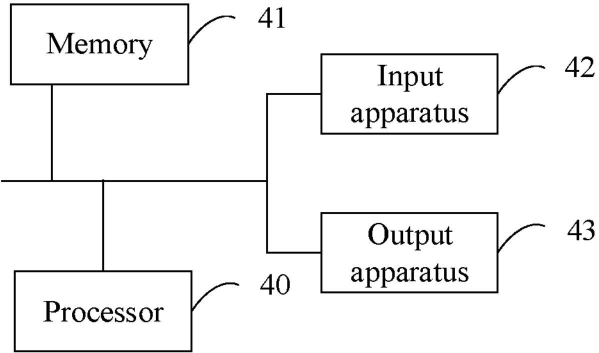
FIG. 4 is a schematic structural diagram of an electronic device provided in Embodiment 4 of the present disclosure.

FIG. 4 is a schematic structural diagram of an electronic device provided in Embodiment 4 of the present disclosure. As shown in FIG. 4, the electronic device includes a processor 40, a memory 41, an input apparatus 42, and an output apparatus 43. One or more processors 40 may be provided in the electronic device, and one processor 40 is used as an example in FIG. 4. The processor 40, the memory 41, the input apparatus 42, and the output apparatus 43 in the electronic device may be connected through a bus or in other ways, and they are connected through a bus as an example in FIG. 4.

As a computer-readable storage medium, the memory 41 may be used to store a software program, a computer executable program, and modules, such as program instructions/modules corresponding to the obstacle recognition method in the embodiments of the present disclosure. The processor 40 executes various functional applications and data processing of the electronic device by running the software program, instructions, and modules stored in the memory 41, to implement the foregoing obstacle recognition method.

The memory 41 may mainly include a program storage region and a data storage region, where the program storage region may store an operating system, and an application program required for at least one function; and the data storage region may store data created according to use of a terminal, and the like. In addition, the memory 41 may include a high speed random access memory, and may alternatively include a non-volatile memory, such as at least one of a magnetic disk storage device, a flash memory, or other non-volatile solid-state storage device. In some examples, the memory 41 may further include memories arranged remotely from the processor 40, and these remote memories may be connected to the electronic device through a network. Embodiments of the network include, but are not limited to, the Internet, an intranet, a local area network, a mobile communications network, or a combination thereof.

Embodiment 5

Embodiment 5 of the present disclosure further provides a storage medium including computer-executable instructions. The computer-executable instructions are used to execute an obstacle recognition method when being executed by a computer processor, the method including:

determining a candidate obstacle region in a candidate weeding region image according to color information of the candidate weeding region image;

obtaining contour information of the candidate obstacle region, where the contour information includes chrominance information, range information, and roughness information; and determining, according to preset contour information determination conditions and the contour information, whether there is an obstacle in the candidate weeding region image.

The computer-executable instructions included in the storage medium provided in the embodiment of the present disclosure are not limited to the foregoing method operations, but may also execute related operations in the obstacle recognition method provided in any embodiment of the present disclosure.

From the above description of the embodiments, those skilled in the art may clearly understand that the present disclosure may be implemented by means of software and necessary general-purpose hardware, and may alternatively be implemented by hardware, but in many cases the former is better. Based on such an understanding, the technical solution of the present disclosure substantially, or the part of the present disclosure making contribution to the prior art may be embodied in the form of a software product, and the computer software product may be stored in a computer-readable storage medium, such as a floppy disk of a computer, a read-only memory (ROM), a random access memory (RAM), a flash, a hard disk or a CD, including a number of instructions enabling a computer device (which may be a personal computer, a server, or a network communication device) to execute the method described in each embodiment of the present disclosure.

It is worth noting that, in the embodiment of the foregoing obstacle recognition apparatus, the included units and modules are merely divided according to functional logics, but are not limited to the foregoing division, as long as the corresponding functions can be realized. In addition, the specific names of the functional units are merely for the convenience of distinguishing from each other, and are not used to limit the protection scope of the present disclosure.

Embodiment 6

Embodiment 6 of the present disclosure provides a weeding robot, including a robot body and the electronic device as described in any embodiment of the present disclosure.

Specifically, the electronic device installed on the weeding robot may perform related operations of the obstacle recognition method described in any embodiment of the present disclosure.

The robot body may include a left active driving wheel and a right active driving wheel, which may be driven by a motor respectively. The motor may be a brushless motor with a gearbox and a Hall sensor. The robot body controls the speed and direction of the two active driving wheels to achieve forward, backward, turning, and arc driving operations. The robot body further includes a universal wheel, a camera, and a rechargeable battery, among which the universal wheel plays a supporting and balancing role. The camera is installed at a designated position of the robot at a preset angle to the horizontal direction to capture a candidate weeding region image. The rechargeable battery is used to provide power for the robot to work.

It should be noted that the foregoing descriptions are merely preferred embodiments of the present disclosure and applied technical principles. Those skilled in the art will understand that the present disclosure is not limited to the specific embodiments described herein, and various obvious changes, readjustments and substitutions can be made by those skilled in the art without departing from the protection scope of the present disclosure. Therefore, although the present disclosure is described in detail through the above embodiments, the present disclosure is not limited to the above embodiments, and may further include more other equivalent embodiments without departing from the concept of the present disclosure. The scope of the present disclosure is determined by the scope of the appended claims.

The invention claimed is:

1. A method for determining whether an obstacle exists in a candidate weeding region of a lawn so that a weeding robot may work in the lawn and avoid working at the obstacle, the method comprising the steps of:

obtaining a candidate weeding region image;

determining a candidate obstacle region in the candidate weeding region image according to color information of the candidate weeding region image;

obtaining contour information of the candidate obstacle region, wherein the contour information includes chrominance information, range information, and roughness information; and determining, according to preset contour information determination conditions and the contour information, whether there is an obstacle in the candidate weeding region image, so that the weeding robot may work in the lawn and avoid working at the obstacle, wherein the step of determining, according to preset contour information determination conditions and the contour information, whether there is an obstacle in the candidate weeding region image comprises determining a value of the chrominance information, and then:

a. if the value of the chrominance information is greater than or equal to a preset chrominance threshold, determining whether the range information is greater than a first preset range threshold, and whether the roughness information is less than a first preset roughness threshold; and if so, determining that there is an obstacle in the candidate weeding region image; and b. if the value of the chrominance information is less than the preset chrominance threshold, determining whether the range information is greater than a second preset range threshold, and whether the roughness information is less than a second preset roughness threshold; and if so, determining that there is an obstacle in the candidate weeding region image, wherein the first preset range threshold is less than the second preset range threshold.

2. The method according to claim 1, wherein the step of determining a candidate obstacle region in the candidate weeding region image according to color information of the candidate weeding region image comprises:

obtaining a color segmentation image of the candidate weeding region image according to the color information of the candidate weeding region image; and morphologically processing the color segmentation image, and determining a region with a preset color as the candidate obstacle region from the morphologically processed color segmentation image.

3. The method according to claim 1, wherein the contour information further comprises:

position information; and correspondingly, the step of determining, according to preset contour information determination conditions and the contour information, whether there is an obstacle in the candidate weeding region image further comprises:

if the value of the chrominance information is less than the preset chrominance threshold, the range information is greater than the second preset range threshold, and the roughness information is less than the second preset roughness threshold, determining whether the position information is greater than a preset position threshold; and if so, determining that there is an obstacle in the candidate weeding region image.

4. The method according to claim 1, wherein the roughness information is determined according to the following steps:

obtaining a value channel image of the candidate weeding region image;

performing edge extraction on the value channel image to obtain an edge image; and determining the roughness information according to gray values of pixels in edge information of the edge image.

5. An electronic device comprising:

one or more processors; and a storage apparatus configured to store one or more programs, wherein when the one or more programs are executed by the one or more processors, the one or more processors are enabled to implement the method according to claim 1.

6. A non-transitory computer-readable storage medium storing a computer program, wherein when the computer program is executed by a processor, the method according to claim 1 is implemented.

7. A weeding robot comprising a robot body and the electronic device according to claim 5.

* * * * *